(Model.)
J. HYSLOP, Jr.
Method of Trimming Heads of Nails and Rivets.
No. 243,267.  Patented June 21, 1881.
Fig. 1.
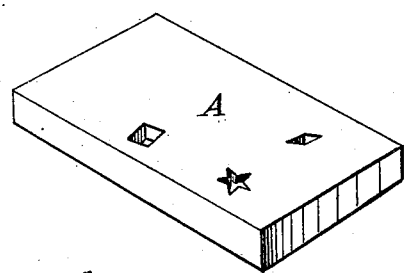
Fig. 2.
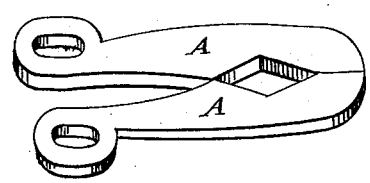
Fig. 3.  Fig. 4.  Fig. 5.
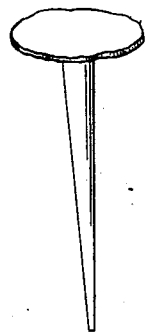 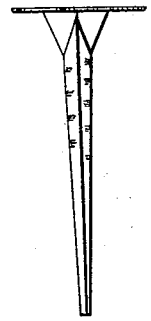 
Fig. 6.
   
  
WITNESSES:
Chas. Nida.
C. Sedgwick
INVENTOR:
J. Hyslop Jr.
BY Munn &Co.
ATTORNEYS.
N. PETERS. Photo-Lithographer, Washington, D. C.

UNITED STATES PATENT OFFICE.

JOHN HYSLOP, JR., OF ABINGTON, MASSACHUSETTS, ASSIGNOR TO ABINGTON TACK AND MACHINE ASSOCIATION, OF SAME PLACE.

METHOD OF TRIMMING HEADS OF NAILS AND RIVETS.

SPECIFICATION forming part of Letters Patent No. 243,267, dated June 21, 1881.

Application filed September 16, 1880. (Model.)

*To all whom it may concern:*

Be it known that I, JOHN HYSLOP, Jr., of Abington, in the county of Plymouth and State of Massachusetts, have invented a new and Improved Method of Finishing the Heads of Tacks, Nails, and Rivets; and I do hereby declare that the following is a full, clear, and exact description of the same, reference being had to the accompanying drawings, forming part of this specification, in which—

Figure 1 represents one form of die for finishing the heads of tacks, nails, and rivets. Fig. 2 represents another form of die. Fig. 3 is a perspective view of a tack as it comes from the tack-machine, shown as enlarged. Fig. 4 is a side elevation of another form of tack as it comes from the tack-machine, shown as enlarged. Fig. 5 is a side elevation of the tack shown in Fig. 4, with its head finished. Fig. 6 is a plan view of a number of finished heads.

In the manufacture of tacks, nails, and rivets the said tacks, nails, and rivets come from the machine with a fin around their heads, making the said heads irregular in shape and size. Heretofore this fin has been removed either by placing them in a revolving drum or by forcing them through a die head foremost, as shown in Rugg's patent, August 31, 1842, No. 2,766, wherein the nail, tack, or bolt is placed in a hollow plunger with its head downward and forced through a die. There are serious objections to both of the above methods. If the tacks, nails, &c., be placed in a revolving drum to wear off the fin and give shape to the heads, it will be found that the heads will be left irregular in shape and uneven in size, the thinner parts of the heads wearing off more rapidly than the thicker parts. Another serious objection to this method is that the long-continued friction polishes the bodies of the tacks and nails, so that they do not properly hold the wood into which they are driven. If they be finished by forcing them through a die head foremost, as shown in the above-named patent, a bolt with a head only a trifle larger than its body cannot be trimmed. The head being only a trifle larger than the body, the head would not be any larger, if as large, as the punch or plunger, and therefore would not be trimmed when the plunger passed through the die. Star-shaped headed nails or tacks could not be finished by Rugg's method, as the points could not be cut entirely to the body of the nail. The same is true of all nails with fancy heads. Only tacks, nails, and rivets with head considerably larger than their bodies, or those whose bodies are in the center of the heads, can be trimmed by Rugg's method. Again, the tacks, nails, or bolts to be trimmed having to be placed in a hollow plunger with its head downward necessitates their being placed there by hand, which, of course, renders it a slow and tedious operation. Still another disadvantage of this method is that it incurs the additional trouble and expense of making the plunger hollow, whereby it is weakened and its durability greatly impaired.

The object of this invention is to overcome these difficulties and permit tacks, nails, and rivets with heads of any size or configuration to be trimmed to give to their heads the same size and shape, and to permit of their being fed automatically to the die from the nail-machine.

To this end my invention consists in forcing tacks, nails, and rivets, as they come from the nail-machine, point foremost through a die of the desired shape.

In carrying my invention into practice I take the tacks, nails, rivets, &c., as they come from the machine, and force them point foremost through a die, A, having the form to be given to the head, by means of a solid punch or plunger of corresponding form. By forcing the tacks, nails, rivets, &c., point foremost, instead of head foremost, as in Rugg's patent, I am enabled to feed the tacks, nails, &c., automatically to the die from the nail-machine, to finish tacks, nails, &c., having heads of various sizes and configurations, and to give to all the heads the same shape and size.

Any desired shape can be given to the heads—as, for instance, they may be made circular, square, diamond-shaped, star-shaped, heart-shaped, leaf-shaped, or any other desired shape which fancy may dictate.

Having thus described my invention, what I claim as new is—

The herein-described process of finishing the heads of tacks, nails, and rivets, which consists in forcing them point foremost through a die of the desired shape, substantially as set forth.

JOHN HYSLOP, JR.

Witnesses:
JOHN F. ALDEN,
CHARLES W. AIKEN.